Oct. 20, 1936.  R. T. FIELDS  2,057,673
PREPARATION OF POLYMERIZED ORGANIC COMPOUNDS
Filed June 26, 1935

Reuben T. Fields INVENTOR.

BY

ATTORNEY.

Patented Oct. 20, 1936

2,057,673

UNITED STATES PATENT OFFICE 2,057,673

PREPARATION OF POLYMERIZED ORGANIC COMPOUNDS

Reuben T. Fields, Arlington, N. J., assignor, by mesne assignments, to E. I. du Pont de Nemours & Company, Wilmington, Del., a corporation of Delaware Application June 26, 1935, Serial No. 28,403

4 Claims. (Cl. 18—55)

This invention relates to the preparation of polymerized organic compounds and, more particularly, to a process of preparing elongated shapes of indefinite length of a polymerized organic compound.

In copending application of Charles M. Fields, entitled "Polymerization process", executed of even date herewith, is described and claimed a process of polymerizing a liquid composition containing a monomeric polymerizable organic compound, preferably monomeric methyl methacrylate or a liquid syrup of polymeric methyl methacrylate dissolved in monomeric methyl methacrylate. This process of polymerizing is carried out by introducing the liquid composition into an elongated mold closed at one end, and preferably with moderate pressure applied by means of an inert fluid on the opposite end of the body of liquid, applying heat to a narrow zone at the closed end of the mold until the monomeric compound in that zone is substantially polymerized, and progressively advancing the heating zone along the major axis of the mold at about the rate at which the monomeric compound in the mold is polymerized while maintaining the temperature of the liquid composition ahead of the advancing heated zone at a temperature below that at which the monomer contained therein will undergo active polymerization.

As disclosed in the above mentioned application, the process of polymerization can be conveniently carried out by slowly immersing the mold containing the liquid composition vertically into a liquid bath such as a water bath. Also it may be carried out by positioning the mold containing the liquid composition horizontally and applying heat thereto by means of a spray of hot water, or the like, while maintaining the mold and its contents ahead of the advancing heat zone cool by means of a cold spray, the two sprays being separated by an insulating partition in order that a sharp line may be kept between the heating and cooling zones.

While the process as described in said application is highly advantageous for producing elongated rods, tubes, blocks, and other primary shapes from which articles may be fabricated by machining processes, the length of any article polymerized is necessarily limited to the length of the mold employed. Where rods and tubes of great length are required, it is an obvious drawback to form such shapes in a mold as long as the length of rod or tube required.

An object of the present invention is to provide a process of preparing these elongated shapes such as rods and tubes of indefinite length of a polymerized organic compound. A further object of the present invention is to provide a method of preparing such shapes of indefinite length without necessitating the use of a mold of abnormal length. Other objects of the invention will be apparent from the description given hereinafter.

The above objects are accomplished according to the present invention by introducing the liquid composition containing the monomeric polymerizable organic compound into an elongated mold having one end closed by means of a closure made of the organic compound polymerized to the solid state, then polymerizing the liquid composition in accordance with the process described above and, when the liquid composition throughout the mold has been converted to the solid state, sliding the solid body thus formed partially out of the mold through the end which had been closed by means of the closure of polymerized compound until the greater proportion of the solid body extends out of the mold, and introducing a further quantity of the liquid composition into the mold from the opposite end thereof and repeating the heating step to convert same into a solid.

It has been discovered that, by closing or plugging one end of a mold with a plug or closure made of the organic compound polymerized to the solid state, the monomeric organic compound when introduced into the mold will soften said plug or closure to make a perfect seal at that end of the mold and, furthermore, upon polymerization of the monomeric compound, it will from an integral solid with the polymerized compound of which the plug or closure is made. It will thus be seen that, by sliding the polymerized solid body substantially all the way out of the mold except for a small portion sufficient to plug the mold and introducing more monomeric compound in the mold, polymerizing same, again shifting the integral solid body thus formed almost all the way out of the mold, and again adding more monomeric compound and polymerizing, a rod, tube, or the like, of indefinite length can be made by the use of a mold whose length is but a fraction of the length of the finished article.

Referring to the drawing forming part of the present specification wherein like reference numerals refer to like parts in the various figures.

Figure 1:
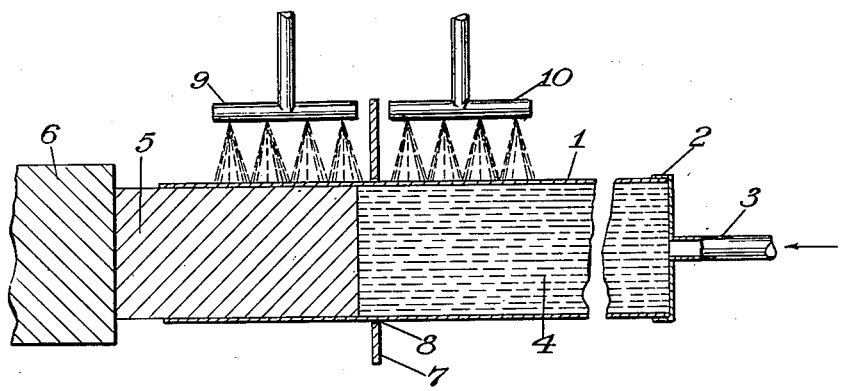
Fig. 1 is a more or less diagrammatic vertical section through an apparatus adapted to carry out the present invention, the elements of the apparatus being shown in their relative positions at the initial stage of the process.

Referring to Fig. 1, reference numeral 1 designates an elongated horizontally disposed rod mold, preferably made of a seamless wrought aluminum pipe, provided with a cap 2 carrying the tube 3. The tube 3 communicates with a source of the polymerizable liquid (not illustrated) which, in turn, is connected to a tank of inert gas under pressure so that the polymerizable liquid may be forced into the tube 3 in the direction of the arrow and into the mold 1 and maintained there under pressure. The polymerizable liquid in the mold 1 is indicated by reference numeral 4.

The end of mold 1 opposite cap 3 is open and in it is inserted the closure or plug 5 of the same composition as the polymerizable liquid 4, except that it has been polymerized to solid form. This closure 5 may be of any length, usually at the start of the process it will be a short piece of material previously polymerized in the mold 1 or a mold of the same internal dimensions. An adjustable abutment 6 is provided to hold the closure 5 in place against pressure exerted thereon by the liquid 4. An insulating screen 7 is employed and the mold 1 is passed through the hole 8 in screen 7 as illustrated. Disposed on each side of screen 7 are the sprays 9 and 10. Spray 9 sprays hot water on the mold 1 as it is passed through the hole, in the direction of the arrow, while spray 10 sprays cold water on that portion of the mold on its side of screen 7.

In carrying out the present invention, using methyl methacrylate as the organic compound for illustration, a plug or closure 5 of polymerized methyl methacrylate is inserted in mold 1 a short distance as illustrated in Fig. 1 and a thin syrup of polymeric methyl methacrylate dissolved in monomeric methyl methacrylate is conducted into and fills the rest of mold 1. The abutment 6 keeps the closure 5 in place. The solvent action of the liquid 4 on the end of closure 5 exposed to it, swells the end of the closure after a short contact to make a tight joint, so that even under pressure the liquid 4 cannot escape. Moderate pressure is then exerted upon liquid 4 by means of gas pressure on the source of liquid to which tube 3 is connected. The mold 1 is positioned with respect to screen 7 as shown in Fig. 1 at the start of the process so that only a narrow zone or layer of liquid 4 adjacent closure 5 is heated by spray 9. When this zone is substantially polymerized through the effect of the heat from spray 9, the mold 1 is shifted slightly to the left as shown in Fig. 1, in order that a second narrow layer of the liquid may be heated by the spray 9 and accordingly polymerized. Polymerization of the entire contents of mold 1 is thus accomplished by progressively advancing the heating zone at about the rate the monomeric methyl methacrylate in liquid 4 is being substantially polymerized through shifting the mold 1 to the left. It will be understood that this can be done either step by step or continuously by suitable mechanical arrangements.

When polymerization of the liquid 4 contained in mold 1 is substantially complete, it will be found that the closure 5 has become an integral part of the solid polymer in the mold 1. The integral solid body is then pulled out of the mold 1 in the direction of the arrow until only a small portion of the solid body remains in the mold 1 to plug its open end, it being understood that the pressure on the liquid is preferably not cut off during this operation. Thereupon the mold 1 is again filled with liquid 4 which, acting on the end of the integral solid body extending into mold 1 and exposed to liquid 4, swells up this end so that it forms a tight closure as had been originally done by closure 5. The polymerization of the liquid 4 now in mold 1 is carried out as before. By repeating this process a solid integral rod of polymerized methyl methacrylate of any desired length may be obtained. It will be understood that the abutment 6 will be adjustable to permit moving of the mold 1 to the left and also to permit the sliding out of the polymerized solid body after the completion of the polymerization of the liquid in the mold 1 each time.

Figure 2:
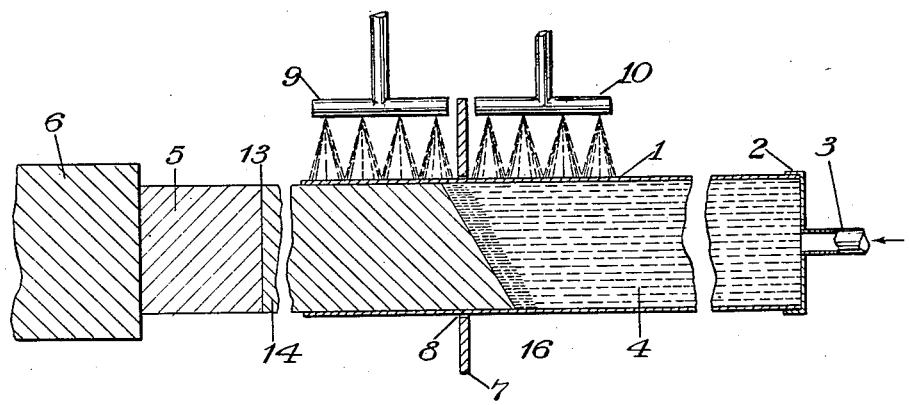
Fig. 2 is a view similar to Fig. 1 but illustrating the relative positions of the elements of the apparatus at an intermediate state of the process.

In Fig. 2 is illustrated the apparatus at an intermediate stage in the process. At this stage of the process the conversion of the liquid 4 into a solid by polymerization is substantially advanced. The closure 5 has already been withdrawn from the mold 1 as well as one section of liquid 4 already converted into a solid. The line 13 indicates the division between the closure 5 and the polymerized solid 14. It will be understood that this line 13 is merely for purposes of illustration as, in actual practice, there is no apparent visible line of demarcation between the closure 5 and the solid polymer which has been formed adjacent to the end of the closure 5.

In this form of apparatus the effect of settling of polymer tends to tilt the plane of the layer which is undergoing active polymerization out of perpendicular, said layer being indicated by reference numeral 16 in Fig. 2. This does not cause any objectionable results but it will be understood that, when the process is carried out in a horizontally disposed mold as illustrated, it is quite necessary to keep the contents of the mold under some pressure in order to obtain a flawless polymer the full cross section of the mold.

The following specific example is given to illustrate one method of carrying out the present invention:

*Example*

A piece of polymerized methyl methacrylate rod, 2" long, cut from a rod formed in a mold of seamless aluminum tubing of inside diameter 0.490" and outside diameter 0.675" is inserted into the open end of the empty mold to a distance of 1.5". The mold is 36" long. The mold is disposed horizontally and is filled by being connected with a reservoir containing a syrup of polymerized methyl methacrylate dissolved in monomeric methyl methacrylate, said syrup having been previously formed by heating monomeric methyl methacrylate for a period of 4 hours at 65° C. and then adding to it 0.1% by weight of benzoyl peroxide. After an hour or so, the end of the rod forming the closure of the mold is swollen sufficiently by contact with the monomeric methyl methacrylate in the syrup to constitute a perfect seal against leakage of the syrup. The plug is backed up against a stationary stop which prevents it from being pushed out of the mold by pressure.

Pressure of 75 pounds per square inch is now applied, by means of nitrogen gas, upon the syrup reservoir and thus to the contents of the mold and heat is applied, beginning at the plugged end of the mold and advancing at a rate of 1" per hour toward the other end of the mold. At the end of 34 hours the entire length of the mold will have been heated and its contents substantially polymerized except the last 2" at the reservoir end. The mold and its contents are then cooled by the application of cold water. The protruding end of the initial rod used as a plug is then seized and pulled out so that the rod formed in the mold is pulled out through the open end until only 2" of it remain within the mold. During this withdrawal the mold is kept filled with a new supply of syrup forced in from the reservoir as the rod is pulled forward, so that no air enters the mold.

At this point the total length of the rod will be 34½" made up of ½" of the initial rod which protruded from the mold and 34" of length from within the mold. When this has been pulled out as indicated 32½" of the length of the rod will be outside of the mold. Heat is now applied to the mold and as in the first place and an additional length of polymerized methyl methacrylate is thus built up, again to within 2" of the reservoir end of the mold. Thus there is formed a continuous rod of total length of 66½". Another repetition of the cycle adds 32" more to its length making a total of 98½" which is then removed after chilling the mold as before.

At the time when heat is withdrawn and the mold and its contents are chilled in preparation for pulling the polymerized contents out through the open end, the material in the zone then active is in part of a rubbery gelatinous consistency. This may cause difficulty in withdrawing the mass even when throughout the rest of the mold the polymerized mass is capable of readily sliding. If desired, this difficulty may be overcome by tapering a short length of the mold at the end adjacent to the reservoir connection. The tapering may be accomplished, with no sacrifice of the advantages of an untapered mold and, of the use for that purpose, of commercial seamless tubing, by providing the taper in a separate fitting to which the mold proper is threaded and which fitting forms a short tapered extension of the untapered mold. In using a tapered end to the mold the polymerization should be carried up into this tapered end each time that it is desired to move polymerized material out of the mold and to check reaction while the active zone of polymerization lies within the tapered portion of the mold. Preferably, the tapered portion of the mold is polished to assist that portion in releasing the partially polymerized methyl methacrylate.

It will be understood that the above example is merely illustrative and that the process may be varied widely without departing from the spirit of the invention. Elongated molds of various cross section may be employed. Likewise, the heating and cooling means for providing a narrow heated zone wherein the polymerization is actively going forward may be effected not only by the sprays as illustrated in the drawing but also by other heating and cooling means such as coils, jackets, baths, electrical means, and the like. It is convenient to carry out the process with a horizontally disposed elongated mold but, if desired, the mold can be disposed in vertical position and suitable heating and cooling means provided.

The temperature to which the polymerizable liquid is heated in the shallow layer to be polymerized will be chosen as suitable for the particular liquid in question under the conditions of pressure and cross sectional dimensions of the mold employed. Normally the temperature selected will be high enough to permit polymerization at an economical speed but not so high as to involve risk of overheating. Since the polymerization reaction is exothermic, the water spray, or bath, or other heating medium to which the mold is subjected, may serve not only to provide the heat which initiates the polymerization reaction but also to prevent overheating by absorbing heat liberated within the polymerizing material.

The process of the present invention is applicable to polymerizable organic liquids generally where the polymerization reaction involves serious factors of exothermicity and shrinkage. In the following list are given some of the organic polymerizable materials suitable for use in this process:

Methyl methacrylate
Ethyl methacrylate
Butyl methacrylate
Isobutyl methacrylate
Secondary butyl methacrylate
Tertiary amyl methacrylate
Phenyl methacrylate
Glycol monomethacrylate
Glycol dimethacrylate
Cyclohexyl methacrylate
Para-cyclohexylphenyl methacrylate
Decahydro-beta-naphthol methacrylate
Di-isopropyl carbinol methacrylate Furfuryl methacrylate
Tetrahydrofurfuryl methacrylate
Methacrylonitrile
Styrene
Alpha methyl styrene
Divinyl benzene
Vinyl acetate
Vinyl acetate-vinyl chloride
Vinyl butyrate
Vinyl chlorobenzene
Vinyl naphthalene
Vinyl ethinyl carbinol
Methyl vinyl ketone
Ethyl methylene malonate
Dimethyl itaconate
Dimethyl acetylene Interpolymers may also be used.

Since the primary purpose of the present invention is the manufacture of turnery shapes, it will be evident that the process will not ordinarily be applied to the polymerization of the softer resins not generally used for turnery purposes. Among such resins may be mentioned:

Methyl acrylate
Ethyl acrylate
Butyl acrylate

Diethyl fumarate
Diethyl maleate
Divinyl ether

It is to be understood, however, that the present process is applicable to these softer resins and in some instances, it is highly desirable to polymerize these resins in elongated shapes.

It is to be understood that coloring matter, either soluble or insoluble, plasticizers, and the like, may be mixed in the liquids to be polymerized. Likewise, polymerization catalysts, such as benzoyl peroxide. In the selection and use of these various modifying agents, catalysts, and the like, due consideration must be given to the properties desired in the finished polymer. Where a polymer is to be used for turnery purposes, generally plasticizers are unnecessary or even undesirable. Likewise, since many of these liquids polymerize to brilliantly clear solids, and one of their most desirable properties is this clearness, care must be taken in introducing modifying agents, catalysts, and the like, so as not to cause haziness. The precautions necessary will be readily understood by those skilled in the art.

It is quite advantageous to employ instead of a polymerizable organic liquid substantially completely in monomeric form, a syrup of the polymer dissolved in the monomer. Such syrup can be obtained by partially polymerizing the monomer prior to introduction into the mold or by deliberately dissolving fully polymerized material in monomer. The use of these syrups, of the highest viscosity that can be conveniently poured into the molds, is preferred. The use of these syrups of polymer dissolved in monomer increases the speed and smoothness of the process, inasmuch as active polymerization of the material upon heating is induced more quickly. Also, the high viscosity of these syrups strongly tends to prevent the development of convection currents which carry the heated material away from the layer undergoing active polymerization into the layers above and thus make it difficult to maintain the requisite demarcation between hot and cool zones, upon which the process depends.

The process of the present invention may be employed for the polymerization of polymerizable organic compounds in elongated shapes for use in turnery operations, and the like. An outstanding advantage of the process is that it provides an economical and practical means of forming elongated shapes of indefinite length without requiring molds of a length more than ordinarily available and convenient to manipulate.

As many apparently widely different embodiments of this invention may be made without departing from the spirit and scope thereof, it is to be understood that the invention is not limited to the specific embodiments thereof except as defined in the appended claims.

I claim:

1. Process of preparing elongated shapes of indefinite length of a polymerized organic compound, which comprises introducing a liquid composition comprising a monomeric polymerizable organic compound into an elongated mold having one end closed by means of a closure made of said organic compound polymerized to the solid state, applying heat to a narrow zone at the closed end of the mold until the monomeric compound in that zone is substantially polymerized, progressively advancing the heating zone along the major axis of the mold at about the rate at which the monomeric compound in the mold is being polymerized while maintaining the liquid composition ahead of the advancing heating zone at a temperature below that at which the monomeric compound will undergo active polymerization, until the monomeric compound throughout the mold is substantially polymerized and has formed an integral solid body with said closure, sliding the solid body partially out of the mold through said end until the greater proportion of the solid body extends out of said mold, and introducing a further quantity of said liquid composition into the mold from the opposite end thereof and repeating said heating to convert same into a solid.

2. Process of preparing elongated shapes of indefinite length of a polymerized organic compound, which comprises introducing a liquid composition comprising a monomeric polymerizable organic compound into an elongated mold having one end closed by means of a closure made of said organic compound polymerized to the solid state, disposing said mold with its major axis horizontal and exerting pressure on the body of liquid composition by means of a fluid from the opposite end of the mold, spraying a narrow zone at the closed end of the mold with a liquid at a temperature sufficient to induce polymerization of the monomeric compound, until the monomeric compound in that zone is substantially polymerized, progressively advancing the heating zone along the major axis of the mold at about the rate at which the monomeric compound in the mold is being polymerized while maintaining the liquid composition ahead of the advancing heating zone at a temperature below that at which the monomeric compound will undergo active polymerization, until the monomeric compound throughout the mold is substantially polymerized and has formed an integral solid body with said closure in one end of the mold, sliding the solid body partially out of the mold through said end until the greater proportion of the solid body extends out of said mold, and introducing a further quantity of said liquid composition into the mold from the opposite end thereof and repeating said heating to convert same into a solid.

3. Process of preparing elongated shapes of indefinite length of polymerized methyl methacrylate, which comprises introducing a syrup of polymerized methyl methacrylate dissolved in monomeric methyl methacrylate into an elongated mold having one end closed by means of a closure made of polymerized methyl methacrylate, applying heat to a narrow zone at the closed end of the mold until the monomeric methyl methacrylate in that zone is substantially polymerized, progressively advancing the heating zone along the major axis of the mold at about the rate at which the monomeric methyl methacrylate in the mold is being polymerized while maintaining the syrup ahead of the advancing heating zone at a temperature below that at which the monomeric methyl methacrylate will undergo active polymerization, until the monomeric methyl methacrylate throughout the mold is substantially polymerized and has formed an integral solid body with said closure, sliding the solid body partially out of the mold through said end until the greater proportion of the solid body extends out of said mold, and introducing a further quantity of said syrup into the mold from the opposite end thereof and repeating said heating to convert same into a solid.

4. Process of preparing elongated shapes of indefinite length of polymerized methyl methacrylate, which comprises introducing a syrup comprising polymerized methyl methacrylate dissolved in monomeric methyl methacrylate into an elongated mold having one end closed by means of a closure made of polymerized methyl methacrylate, disposing said mold with its major axis horizontal and exerting pressure on the body of syrup by means of a fluid from the opposite end of the mold, spraying a narrow zone at the closed end of the mold with a liquid at a temperature sufficient to induce polymerization of the monomeric methyl methacrylate, until the monomeric methyl methacrylate is substantially polymerized, progressively advancing the heating zone along the major axis of the mold at about the rate at which the monomeric methyl methacrylate in the mold is being polymerized while maintaining the syrup ahead of the advancing heating zone at a temperature below that at which the monomeric methyl methacrylate will undergo active polymerization, until the monomeric methyl methacrylate throughout the mold is substantially polymerized and has formed an integral solid body with said closure in one end of the mold, sliding the solid body partially out of the mold through said end until the greater proportion of the solid body extends out of said mold, and introducing a further quantity of said syrup into the mold from the opposite end thereof and repeating said heating to convert same into a solid.

REUBEN T. FIELDS.